US008388346B2

(12) United States Patent
Rantala et al.

(10) Patent No.: US 8,388,346 B2
(45) Date of Patent: Mar. 5, 2013

(54) TACTILE FEEDBACK

(75) Inventors: Jussi Rantala, Tampere (FI); Roope Raisamo, Tampere (FI); Jani Lylykangas, Viiala (FI); Toni Pakkanen, Tampere (FI); Arto Hippula, Tampere (FI); Jukka Raisamo, Tampere (FI); Veikko Surakka, Tampere (FI); Katri Salminen, Tampere (FI); Roope Takala, Espoo (FI)

(73) Assignee: Nokia Corporation, Espoo (FI)

( * ) Notice: Subject to any disclaimer, the term of this patent is extended or adjusted under 35 U.S.C. 154(b) by 842 days.

(21) Appl. No.: 12/202,262

(22) Filed: Aug. 30, 2008

(65) Prior Publication Data
US 2010/0055651 A1 Mar. 4, 2010

(51) Int. Cl.
*G09B 21/00* (2006.01)

(52) U.S. Cl. .................... 434/114; 434/112; 434/113

(58) Field of Classification Search ............ 434/112, 434/113, 114–117
See application file for complete search history.

(56) References Cited

U.S. PATENT DOCUMENTS

| | | | | |
|---|---|---|---|---|
| 3,230,644 | A * | 1/1966 | Irazoqui | 434/114 |
| 4,500,293 | A * | 2/1985 | Eltgen | 434/114 |
| 4,836,784 | A * | 6/1989 | Joachim | 434/113 |
| 5,103,485 | A * | 4/1992 | Yamada et al. | 382/114 |
| 5,574,830 | A * | 11/1996 | Quzilleau | 358/1.3 |
| 5,580,251 | A * | 12/1996 | Gilkes et al. | 434/113 |
| 5,685,721 | A | 11/1997 | Decker | |
| 5,942,970 | A * | 8/1999 | Norman | 340/407.1 |
| 6,189,246 | B1 * | 2/2001 | Gorthala | 40/446 |
| 6,354,839 | B1 | 3/2002 | Schmidt et al. | |
| 6,459,364 | B2 * | 10/2002 | Gupta | 340/407.1 |
| 6,734,785 | B2 | 5/2004 | Petersen | |
| 6,743,021 | B2 | 6/2004 | Prince et al. | |
| 6,776,619 | B1 | 8/2004 | Roberts et al. | |
| 6,827,512 | B1 | 12/2004 | Soulier | |
| 7,009,595 | B2 * | 3/2006 | Roberts et al. | 345/156 |
| 2002/0024533 | A1 * | 2/2002 | Depta | 345/729 |
| 2005/0079472 | A1 * | 4/2005 | Shimamura et al. | 434/114 |
| 2005/0233287 | A1 * | 10/2005 | Bulatov et al. | 434/114 |
| 2008/0055277 | A1 * | 3/2008 | Takenaka et al. | 345/177 |
| 2008/0122589 | A1 * | 5/2008 | Ivanov | 340/407.1 |
| 2008/0174566 | A1 * | 7/2008 | Zuniga Zabala et al. | 345/173 |
| 2008/0252607 | A1 * | 10/2008 | De Jong et al. | 345/173 |

OTHER PUBLICATIONS

Web page, Easy-Link 12 by Quantum Technology, http://www.quantumtechnology.com.au/easylink12, 2 pages, downloaded Mar. 4, 2009.
Web page, Easy Braille Bluetooth by Handy Tech Elektronik GmbH, http://www.handytech.de/index.php?id=394&L=1, 2 pages, downloaded Mar. 4, 2009.
Web page, ESYS Braille by Code Factory, http://codefactory.es/en/press.asp?id=60&y=2007&n=9, 4 pages, downloaded Mar. 4, 2009.
Brewster, S. et al., "Tactons: Structured Tactile Messages for Non-Visual Information Display," 5th Australasian User Interface Conference, vol. 28, 2004, pp. 15-23.

(Continued)

*Primary Examiner* — Xuan Thai
*Assistant Examiner* — Bruk Gebremichael
(74) *Attorney, Agent, or Firm* — Alston & Bird LLP

(57) ABSTRACT

For providing a tactile feedback to a user of a device, textual or graphical information is converted into instructions for a sequence of pulses representing the information. An actuator is then caused to move at least a part of a display according to the obtained instructions.

29 Claims, 9 Drawing Sheets

OTHER PUBLICATIONS

Fukumoto, M. et al., "Active Click: Tactile Feedback for Touch Panels," Extended Abstracts on Human Factors in Computing Systems, Mar. 31-Apr. 5, 2001, pp. 121-122.

Laitinen, P. et al., "Enabling Mobile Haptic Design: Piezoelectric Actuator Technology Properties in Hand Held Devices," IEEE International Workshop on Haptic Audio Visual Environments and Their Applications, Ottawa, Canada, Nov. 4-5, 2006, pp. 40-43.

Leung, R. et al., "Evaluation of Haptically Augmented Touchscreen GUI Elements Under Cognitive Load," Proceedings of the $9^{th}$ International Conference on Multimodal Interfaces, Nov. 12-15, 2007, pp. 374-381.

Levesque, V. et al., "Display of Virtual Braille Dots by Lateral Skin Deformation: Feasibility Study," ACM Transactions on Applied Perception, vol. 2, No. 2, pp. 132-149.

Luk, J. et al., "A Role for Haptics in Mobile Interaction: Initial Design Using a Handheld Tactile Display Prototype," Proceedings of the SIGCHI Conference on Human Factors in Computing Systems, Interaction Techniques: Haptic & Gestural, Montréal, Quebec, Canada, Apr. 22-27, 2006, pp. 171-180.

I. Poupyrev et al., "Tactile Interfaces for Small Touch Screens," Proceedings of the $16^{th}$ Annual ACM Symposium on User Interface Software and Technology, 2003, pp. 217-220.

I. Poupyrev et al., "Ambient Touch: Designing Tactile Interfaces for Handheld Devices," Proceedings of the $15^{th}$ Annual ACM Symposium on User Interface Software and Technology, Oct. 27-30, 2002, Paris, France, vol. 4, issue 2, pp. 51-60.

Ramstein, C., "Combining Haptic and Braille Technologies: Design Issues and Pilot Study," Proceedings of the $2^{nd}$ Annual ACM Conference on Assistive Technologies, Vancouver, British Columbia, Canada, 1996, pp. 37-44.

Roberts, J. et al., "Rotating-Wheel Braille Display for Continuous Refreshable Braille," Digest of Technical Papers, Society for Information Display International Symposium, vol. XXXI, 2000, pp. 1130-1133.

Tikka, V. et al., "Designing Haptic Feedback for Touch Display: Experimental Study of Perceived Intensity and Integration of Haptic and Audio," $1^{st}$ International Workshop on Haptic and Audio Interaction Design, 2006, pp. 36-44.

* cited by examiner

TACTILE FEEDBACK

FIELD OF THE INVENTION

The invention relates to the field of tactile feedback, which is used for presenting information to a user.

BACKGROUND OF THE INVENTION

The visually impaired are faced with many challenges when they use mobile devices such as mobile phones. One side of the problem is inputting data without visual aids. As a result of ergonomics and usability design, numerous mobile phone models have clear and well-shaped buttons that can be memorized rather easily. Compared to the input side of the interaction, a bigger challenge lies in getting feedback and information from the device.

Recently, after the computational power of mobile devices has increased, speech synthesizers have become available also for mobile phones. However, due to the ever increasing amount of graphical content on the screen, screen readers are not always able to interpret all information that should be synthesized to speech. In addition, speech output is not a private medium if used without headphones. In certain situations, for example in public spaces, the use of synthesized speech might be uncomfortable to some users.

Most of the visually impaired are accustomed to using their tactile senses for reading Braille and in many cases this might be the preferred way to acquire information. Braille characters are usually represented by six dots arranged in a 2×3 matrix or eight dots arranged in a 2×4 matrix. For representing different letters, numbers or signs, different dots are raised and lowered in the corresponding Braille character. FIG. 1 presents for illustration the raised dots, represented by large disks 101, and lowered dots, represented by small disks 102, of conventional six-dot Braille characters for the letters 'A', 'B', 'C', 'D' and 'E'.

In office or home environments Braille displays are the most common aid used by the visually impaired to read Braille. Braille displays are mechanical devices that are coupled with screen reader software. Textual information which sighted computer users see on the display is transmitted via screen readers to Braille displays consisting of up to 80 Braille cells. Each cell has six or eight dots for representing a respective Braille character, and each of the dots is controlled by an individual electromechanical actuator.

Smaller Braille displays have been developed for mobile use. These displays are typically equipped with 12 to 40 Braille cells and are connected to mobile phones or PDA devices using Bluetooth.

Moreover, instead of placing individual actuators for each dot in the Braille display, devices using a rotating wheel for creating an illusion of actual Braille cells have been built. Users place their finger against the rotating wheel containing Braille characters and thereby receive an impression of a continuous line of Braille characters without actually moving their finger.

SUMMARY OF SOME EMBODIMENTS OF THE INVENTION

A method is described, which comprises converting at least one of textual information and graphical information into instructions for a sequence of pulses representing the information. The method further comprises causing an actuator to move a display according to the obtained instructions.

Moreover, a first apparatus is described, which comprises a processor. The processor is configured to convert at least one of textual information and graphical information into instructions for a sequence of pulses representing the information. The processor is further configured to cause an actuator to move a display according to the obtained instructions.

The apparatus may comprise for example exclusively the described processor, but it may also comprise additional components. The apparatus could further be for example a module provided for integration into a device, like a processing component, a chip or a circuit implementing the processor, or it could be such a device itself. In the latter case, it could be for instance a device, which comprises in addition the display and the actuator. The processor can be any kind of component that is able to perform some kind of processing and that is configured to realize the defined functions.

Moreover, a second apparatus is described, which comprises means for converting at least one of textual information and graphical information into instructions for a sequence of pulses representing the information, and means for causing an actuator to move a display according to the obtained instructions.

The means of this apparatus can be implemented in hardware and/or software. They may comprise for instance a processor for executing computer program code for realizing the required functions, a memory storing the program code, or both. Alternatively, they could comprise for instance a circuit that is designed to realize the required functions, for instance implemented in a chipset or a chip, like an integrated circuit. It is to be understood that further or correspondingly adapted means may be comprised for realizing any of the functions that may optionally be implemented in any described embodiment of the first apparatus.

Moreover, a device is described which comprises any of the described apparatuses, a display and an actuator configured to be able to move the display.

Moreover, a computer readable storage medium is described, in which computer program code is stored. The computer program code realizes the described method when executed by a processor. The computer readable storage medium is to be understood to be a tangible product. It could be for example a disk or a memory or the like. The computer program code could be stored in the computer readable storage medium in the form of instructions encoding the computer-readable storage medium. It is to be understood that also the computer program code by itself has to be considered an embodiment of the invention.

Thus, certain embodiments of the invention provide that a single actuator is controlled for moving a display in a sequence of pulses. The sequence of pulses represents textual or graphical information that is currently to be provided in the form of a tactile feedback.

The actuator could be arranged in any manner that is suited to move the display. It could be arranged for instance at the backside of the display or even be integrated in the display. It has to be noted that it is only required that the front of the display facing the user can be moved by the actuator, not necessarily the display as a whole. Moving the display may for example be further specified as moving the display of a device relative to a casing of the device.

In one embodiment of the described method, the described apparatuses, the described device or the described computer program code, the actuator could be a piezoelectric actuator. Certain piezoelectric actuators are durable and offer efficient and versatile actuation. Further, they can be designed to be quite thin, which avoids increasing the size of a device, in which it is implemented, significantly. The use of a piezoelectric actuator thus provides considerable freedom to haptic design. The piezoelectric actuator can be of any material exhibiting a converse piezoelectric effect, one example being piezoceramic material.

In one embodiment of the described method, the described apparatuses, the described device or the described computer program code, the display is a visual display. The information could then be for instance information that is visually presented on the display. It is to be understood, however, that a user could also be enabled to deactivate the visual display and receive only the tactile feedback.

In one embodiment of the described method, the described apparatuses, the described device or the described computer program code, the information is textual information and the sequence of pulses comprises for each character of the textual information a plurality of groups of pulses, each group of pulses representing one dot of a multi-dot Braille character. The number of dots and thus the number of groups of pulses can be selected arbitrarily, for instance to six or eight corresponding to the conventional six-dot or eight-dot Braille character representations.

Raised and lowered dots can be differentiated by different groups of pulses. Raised dots could be represented for instance by a group comprising only one strong pulse giving the impression of a bump. Lowered dots could be represented for instance by a group comprising a series of weak pulses resulting in a less powerful vibration-like tactile feedback or even by a group comprising no pulses. Any other association could be selected just the same.

Tactile feedback that is created by a single actuator moving the entire screen of a display cannot be targeted to any specific location on the screen, since the entire display moves simultaneously. Thus, instead of enabling a user to feel all the dots that form a single Braille character simultaneously, as in the case of a conventional Braille display, the described tactile feedback allows a user to perceive each dot of a Braille character individually.

In one embodiment of the described method, the described apparatuses, the described device or the described computer program code, the display comprises a touchscreen. It has to be noted, however, that the use of a touchscreen is not mandatory. Using a touchscreen allows associating the tactile feedback with touch events on the display.

In a variation of this embodiment of the described method or the described computer program code, the actuator is caused to move the display according to the instructions upon detection of a touch of the touchscreen by a user. In a corresponding embodiment of one of the described apparatuses and of the described device, the processor or some other means is configured to detect a touch of the touchscreen by a user and to cause the display to move according to the instructions upon detection of a touch of the touchscreen by a user.

The detection of a touch may simply be used to trigger the start of a tactile feedback, which could then be sensed by holding a finger or stylus still on the screen of the display.

In addition, however, a touchscreen could also be used to create the impression that different haptic feedback is provided at different locations of the screen. When a user touches the screen with a finger or with a stylus, the feedback is perceived to be located right under the contact point. The possibility of creating an illusion of localized feedbacks can also be exploited for creating virtual Braille characters with dots arranged in a matrix. Users could then read Braille characters by moving a stylus or their finger from dot to dot.

In one embodiment of the described method or the described computer program code, the actuator is only caused to move the display after a moving of a touch on the touchscreen by a predetermined distance in a predetermined direction has been detected. In a corresponding embodiment of one of the described apparatuses and of the described device, the processor or some other means is configured to realize a corresponding function. This approach makes it easier for a user to prepare for the start of the tactile feedback.

In one embodiment of the described method or the described computer program code, the instructions for a sequence of pulses comprise instructions for a sequence of groups of pulses. A moving of a touch on the touchscreen by a predetermined distance in a predetermined direction may then be required to be detected before the actuator is caused to move the display according to the instructions for a respective next group of pulses. In a corresponding embodiment of one of the described apparatuses and of the described device, the processor or some other means is configured to realize a corresponding function.

If the groups of pulses are to be used for instance for representing the dots of six-dot Braille characters, the screen area of a display could be divided roughly into six blocks. Each block could then be associated to one dot and the tactile feedback could be produced when touch input is detected in one of the six areas. A monitoring of a movement of a touch would thus not be required in this case. However, detecting a moving of a touch by a predetermined distance in a predetermined direction between the outputs of two groups of pulses in accordance with the last presented embodiment could be used to simplify the handling, since using fixed locations for every dot is not required this way. If a touch of the screen is detected at any desired location, the virtual position of the dots of a Braille character could be adjusted based on this first touch. As a condition for the first touch, it could be requested that it lies within implementation-specific boundaries and that the touch location is valid and accepted.

In a variation of this embodiment of the described method, the described apparatuses, the described device or the described computer program code, each group of pulses represents one dot of a six-dot Braille character. The predetermined direction may then comprise a vertical downward direction between causing the actuator to move the display according to the instructions for the groups of pulses for the first and the second dot, a vertical downward direction between causing the actuator to move the display according to the instructions for the groups of pulses for the second and the third dot, a vertical upward direction between causing the actuator to move the display according to the instructions for the groups of pulses for the third and the fourth dot, a vertical downward direction between causing the actuator to move the display according to the instructions for the groups of pulses for the fourth and the fifth dot, and a vertical downward direction between causing the actuator to move the display according to the instructions for the groups of pulses for the fifth and the sixth dot.

The feedback for the dots thus gives the impression that the six dots are arranged in two vertical lines, as in a conventional six-dot Braille character. Additional conditions may be predefined to determine how the two columns have to lay or may lie relatively to each other.

In one variation of this latter embodiment of the described method, the described apparatuses, the described device or the described computer program code, the predetermined direction between causing the actuator to move the display according to the instructions for the groups of pulses for the third and the fourth dot may comprise in addition to the vertical upward direction a subsequent vertical downward direction.

In another variation of the general embodiment of the described method, the described apparatuses, the described device or the described computer program code monitoring a predetermined direction and distance, a monitored predetermined direction could also comprise a horizontal direction. This would allow for example arranging all virtual dots of a Braille character next to each other.

In one embodiment of the described method or the described computer program code, the actuator is caused to move the display according to the instructions after a predetermined period of time after detection of a touch of a touchscreen by a user. In a corresponding embodiment of one of the described apparatuses and of the described device, the processor or some other means is configured to realize a corresponding function.

In one embodiment of the described method or the described computer program code, the actuator is caused to move the display according to the entire instructions at a predetermined speed. In a corresponding embodiment of one of the described apparatuses and of the described device, the processor or some other means is configured to realize a corresponding function. The output could be triggered in this embodiment by the detection of a touch in case the display comprises a touchscreen, but equally by some other user input, like a pressing of a button, etc.

In one embodiment of the described method, the described apparatuses, the described device or the described computer program code, different pieces of information could be represented by pulses with different amplitudes and/or different frequencies and/or different shapes and/or different rhythms. Different pieces of information could be different types of graphics, graphics compared to textual information, but also components of a single character of textual information, like raised and lowered dots of a multi-dot Braille representation of a character.

In case the information that is to be presented is graphical information, this could enable a blind person to "view" graphical structures such as frame boundaries in a framed web page. The representation of graphical content by means of tactile feedback could also be beneficial to other users than the visually impaired.

Embodiments of the invention can be used in particular with any mobile device having a visual display, since here, the use of an accessory device is burdensome and the acceptable size of display and device are often limited. However, the invention is not limited to mobile devices or to devices having a visual display. A device without visual display could be for instance an accessory device for an information providing device. Certain embodiments of the invention could be implemented at relatively low costs that could be of advantage in various use cases.

In one embodiment, a method is an information providing method, comprising the steps of converting at least one of textual information and graphical information into instructions for a sequence of pulses representing the information, and of causing an actuator to move a display according to the obtained instructions.

In a further embodiment, an apparatus is an information providing apparatus comprising processing means for converting at least one of textual information and graphical information into instructions for a sequence of pulses representing the information, and for causing an actuator to move a display according to the obtained instructions.

In one embodiment of the invention, one of the described apparatuses can be seen as a tactile feedback generation apparatus.

It is to be understood that any feature presented for a particular exemplary embodiment may also be used in combination with any other described exemplary embodiment of any category.

Further, it is to be understood that the presentation of the invention in this section is merely exemplary and non-limiting.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 2:
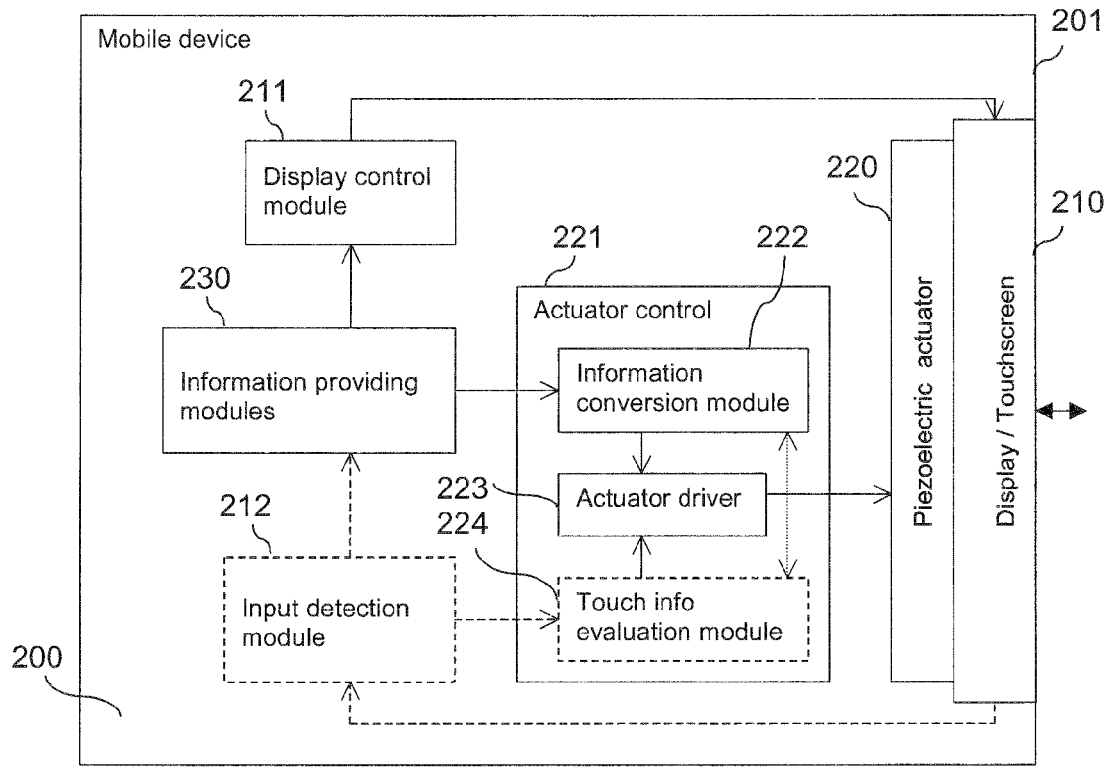
FIG. 2 is a schematic block diagram of a mobile device as an exemplary embodiment of the invention.

FIG. 2 is a high-level block diagram of an exemplary device which supports a tactile feedback for facilitating a use by the visually impaired. Only selected components of the device are shown.

The device 200 can be for instance an electronic handheld tablet enabling an access to the Internet, but equally any other device which comprises a display, like a mobile phone, a personal digital assistant (PDA) or a portable media player.

The device 200 comprises a casing 201, a visual display 210 integrated into the casing 201, and an actuator 220 arranged behind the display 210 and thus on the backside of the display 210 that is normally not visible to a user of the device 200. The device 200 further comprises a display control module 211 linked to the display 210. The device 200 further comprises an actuator control module 221, which includes an information conversion module 222 and an actuator driver module 223. The information conversion module 222 is linked to the actuator driver 223 and the actuator driver 223 is linked to the actuator 220. The device 200 further comprises information providing modules 230, like applications and other functional entities. The information providing modules 230 provide information for visual presentation depending on their respective state. These modules 230 are linked on the one hand to the display control module 211 and on the other hand to the information conversion module 222.

The display 210 comprises by way of example 800×480 pixels, even though other values are possible just the same. The display 210 can have for instance a touchscreen. In this case, an input detection module 212 is provided in addition for detecting a user input via the touchscreen 210. The input detection module 212 is linked to this end to the touchscreen 210 and moreover to the information providing entities 230 and to an additional touch information evaluation module 223 of the actuator control module 221. The touch information evaluation module 223 is arranged to provide an additional input to the actuator driver module 223. The actuator 220 can be for instance a piezoelectric actuator. Such a piezoelectric actuator allows producing various pulse shapes with displacement amplitudes on a scale of several hundred micrometers. The rise and fall times of pulses can be controlled by the current fed to the piezoelectric actuator and the displacement amplitude can be controlled by the driving voltage. Such an actuator thus enables a large variability of the haptic stimuli and allows a large freedom to haptic design.

By its arrangement behind the display 210, controlling the actuator 220 allows controlling a displacement of the display 210 relative to the casing 201. A user of the device 200 touching the display 210 is thus able to detect the displacement of the display 210. The actuator 220 moves the entire display 210 simultaneously so that tactile feedback created by the control of the actuator 220 cannot be targeted to any specific location on the screen of the display 210.

The functional modules of the device 200 of FIG. 2 can be implemented in hardware and/or in software.

Figure 3:
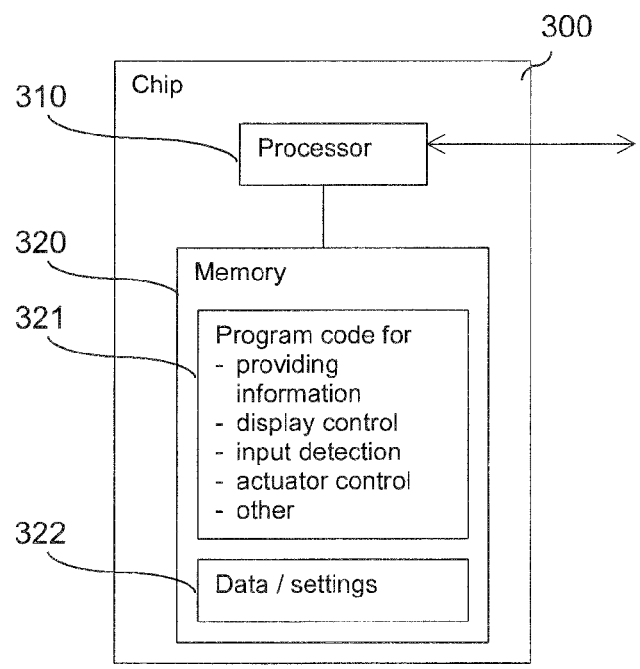
FIG. 3 is a schematic block diagram presenting an exemplary implementation of functional blocks of the device of FIG. 2.

FIG. 3 presents a schematic block diagram of an exemplary implementation of the functional modules of the device 200 of FIG. 2.

The device 200 could comprise a processor 310 that is linked to a memory 320. The processor 310 is configured to execute implemented computer program code. The memory 320 stores computer program code 321, which may be retrieved by the processor 310 for execution. The stored program codes 321 may comprise code for all or some of the functional modules 211, 212, 221 and 230 of the device 200 of FIG. 2. The memory 320 may comprise in addition a data or settings storage portion 322. The processor 310 comprises a suitable interface to display 210 and actuator 220.

Even though not required, the processor 310 and the memory 320 could be integrated in a chip 300. The memory 320 may be understood as constituting a computer readable medium and the processor 310 as a processing unit of a computer configured to execute a computer program embodied as program code stored on the computer readable medium.

A tactile feedback by means of the actuator 220 can be provided for graphical information and/or for textual information that is provided for presentation by an information providing module 230. The tactile feedback for textual information uses by way of example the six-dot Braille characters as a basis.

In a simple embodiment, a raised Braille dot and a lowered Braille dot could be represented by a pulse of the same length and shape, only with different intensity so that raised dots are perceived as stronger clicks and lowered dots as weaker clicks. Additional differences in the representation of raised and lowered dots may facilitate the differentiation significantly, though.

Figure 4:
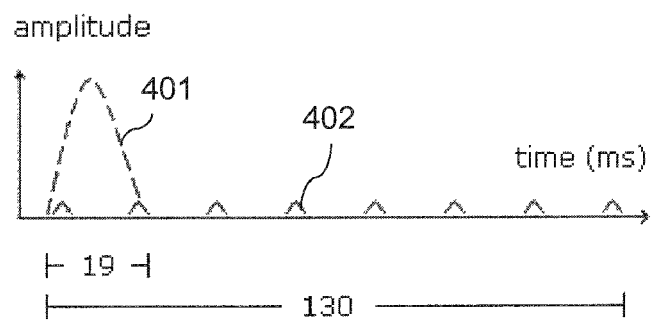
FIG. 4 is a diagram illustrating an exemplary representation of Braille dots by pulses of a tactile feedback.

FIG. 4 is a diagram presenting the amplitude over time in milliseconds (ms) of alternative pulses that could be used for representing raised and lowered dots of a Braille character in device 200.

A raised dot is represented in this embodiment by a single pulse 401, which may be set to be as noticeable as possible, for example to an amplitude level of 30 micrometers (μm). The duration of the pulse could be for example 19 ms. A lowered dot is represented by a vibration pattern that is formed of a sequence of eight pulses 402 having a considerably lower intensity, that is, a lower amplitude. Each of the eight pulses could have for instance a length of 3 ms, with delays of 12 ms between the pulses. The overall duration of the feedback for a lowered dot is then approximately 130 ms.

Graphical elements may equally be represented by pulses in a tactile feedback. Such graphical elements may comprise for instance web page frame boundaries and web links. Different kinds of graphical elements could be indicated by a subtle vibration with different pulse profiles or different rhythms. The vibration profiles should be distinct from the clicks representing raised and lowered Braille dots to enable a clear distinction between graphical data representation and text content. The distinction can be achieved by ensuring that the amplitude, that is, the height or strength, of the pulses employed for the representation of graphical data is clearly different from the amplitude of the pulses employed for the Braille clicks; it could be for example clearly lower. In addition, the distinction can be increased by using a distinct vibrational rhythm and series of pulse trains, like sequences of distinct pulse combinations. Braille and graphics could be distinguished in addition by using higher vibration frequencies for graphics representations. The vibration frequency for graphics could be set for example to a value above 30 Hz, since this is the approximate threshold for sensing of individual clicks as opposed to vibration. Reading Braille is facilitated if individual clicks can be sensed.

Figure 5:
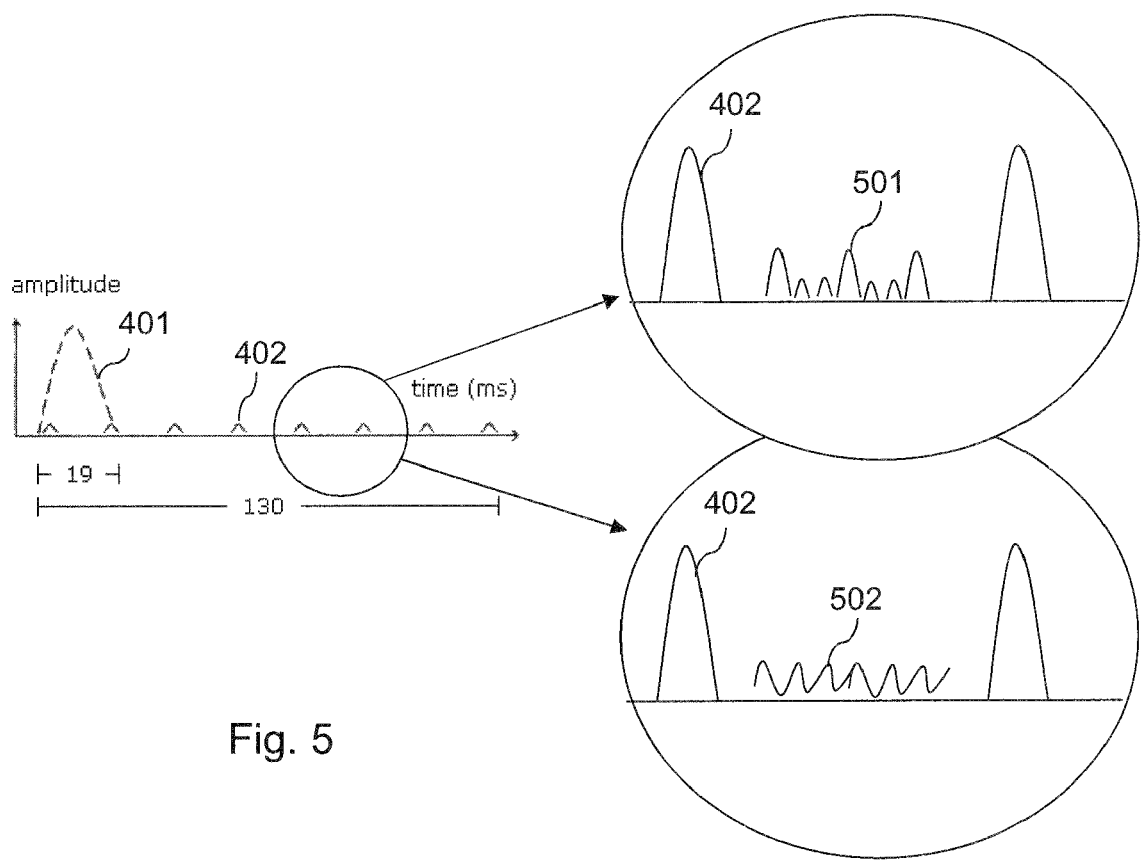
FIG. 5 is a diagram illustrating an exemplary representation of graphical information by pulses of a tactile feedback.

FIG. 5 is a diagram presenting again the amplitude over time of alternative pulses 401, 402 that could be used for representing raised and lowered dots of a Braille character. In addition, it presents a sketch of the tactile feedback for two exemplary distinct graphical representations in comparison to two lowered Braille dots 402.

In the first example, the frequency of the pulses 501 that are used for representing a graphical element is higher than the frequency of the pulses 402. Further, the amplitude of pulses 501 is lower compared to the amplitude of pulses 402. Finally, the amplitude of the pulses 501 is not constant but varying.

In the second example, the frequency of the pulses 502 that are used for representing a graphical element is again higher than the frequency of the pulses 402. Further, the amplitude of pulses 502 is again lower compared to the amplitude of pulses 402. Finally, the shape and phase of the pulses 502 is not constant but varying.

A first exemplary operation of device 200 that may be used for the presentation of textual information will now be described in more detail with reference to the flow chart of FIG. 6. For this operation, the display 210 is assumed to comprise a touchscreen.

The presented operation can be realized by the functional modules 211, 212, 221 and 230 of device 200 of FIG. 2, and equally by processor 310 of FIG. 3 when executing the corresponding computer program code 321 retrieved from memory 320.

In device 200, module 230 provides textual information that is to be presented to a user, for example the text of a received email, to display control module 211. Display control module 211 takes care that the information is presented visually on display 210.

When device 200 is set to a tactile feedback mode (action 600), the information is provided alternatively or in addition to the information conversion module 222.

Information conversion module 222 converts each character of the text into instructions for six groups of pulses. Each group represents one dot of a six-dot Braille character corresponding to a character of the text, as described with reference to FIG. 4. The order of the groups corresponds to the following order of the dots in a 2×3 matrix of a Braille character: upper dot on the left hand side (1), middle dot on the left hand side (2), lower dot on the left hand side (3), upper dot on the right hand side (4), middle dot on the right hand side (5), lower dot on the right hand side (6). The resulting instructions are provided to the actuator driver 223. (action 601)

A counter i, representing the currently considered dot of a Braille character, is initialized to be equal to one. (action 602)

The input detection module 212 monitors whether display 210 is touched and provides corresponding information including the position of the touch to the touch information evaluation module 224.

When the touch information evaluation module 224 determines that a touch in a predetermined area of the touchscreen of the display 210 was detected (action 603), it determines in addition based on further input from the input detection module 212, whether the touch has moved by a predetermined distance in a predetermined direction (action 604).

Once the touch has moved by a predetermined distance in a predetermined direction, the touch information evaluation module 224 informs the actuator driver module 223 accordingly.

The actuator driver module 223 causes the actuator 220 thereupon to move the display according to the instructions for the i-th group of pulses. (action 605)

As long as counter i is smaller than 6 (action 606), the counter is incremented by one (action 607).

The touch information evaluation module 224 determines based on further input from the input detection module 212, whether the touch has moved on by a predetermined distance in a predetermined direction (action 608). If this is the case, actions 605 to 608 are repeated in a loop until counter i reaches a value of 6. It has to be noted that the predetermined distance and the predetermined direction can be different from the predetermined distance and the predetermined direction in step 604. In addition, the predetermined distance and the predetermined direction may vary from one group to the next. A special distance and/or direction may be given in particular between group 4 and 6 representing the last dot of the first column and the first dot of the second column of a Braille character, respectively.

When counter i is found in this process to be equal to 6 (action 606), the actuator driver module 223 determines whether the end of instructions for the groups of pulses has been reached (action 609). This means that tactile feedback has been provided for the entire text. In this case, the operation is terminated (action 610).

Otherwise, the operation continues with action 603 for the next character and thus the instructions for the next six groups of pulses.

Figure 6:
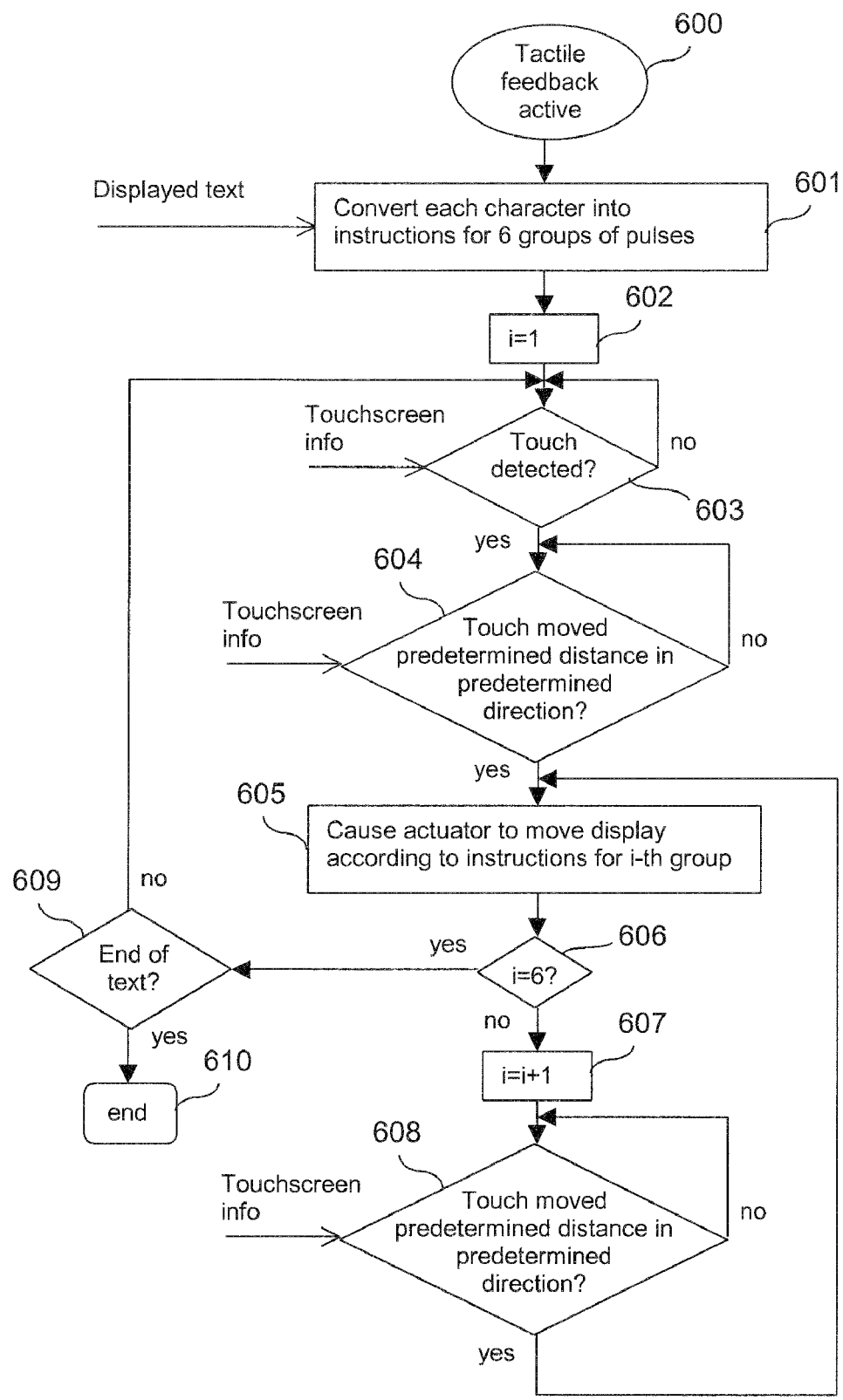
FIG. 6 is a flow chart illustrating a first exemplary operation of the device of FIG. 2.

There are various possibilities how a detected touch has to move on the display 210 to cause the output of the pulses for the respective next dot of a Braille character as checked in actions 604 and 608 of FIG. 6.

Three exemplary options will be presented with reference to FIGS. 7 to 11. Any of the presented options allows a user to touch the touchscreen either with a pen or with bare fingers. For simplicity, only the use of a finger will be mentioned in the following.

Figure 7:
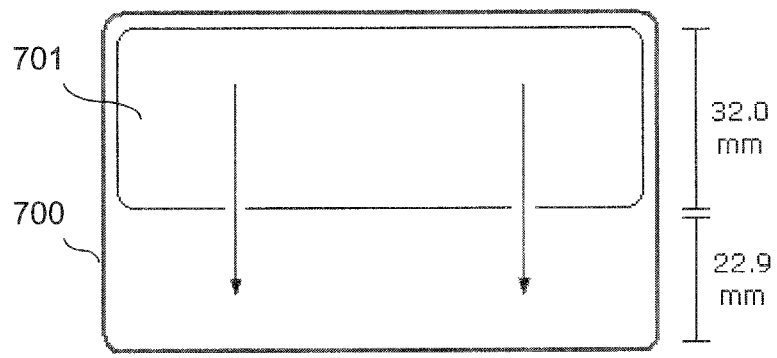
FIG. 7 is a diagram illustrating a start area for a vertical scan of a display that may be supported by the operation of FIG. 6.
Figure 8:
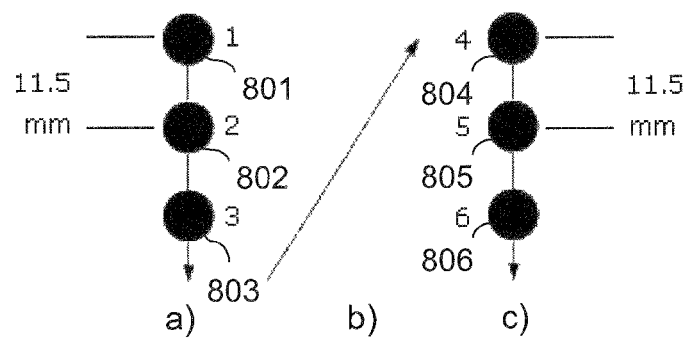
FIG. 8 is a diagram illustrating a first exemplary implementation of a vertical scan.

A first option illustrated in FIGS. 7 and 8 is referred to as 'Braille scan'.

Figure 1:
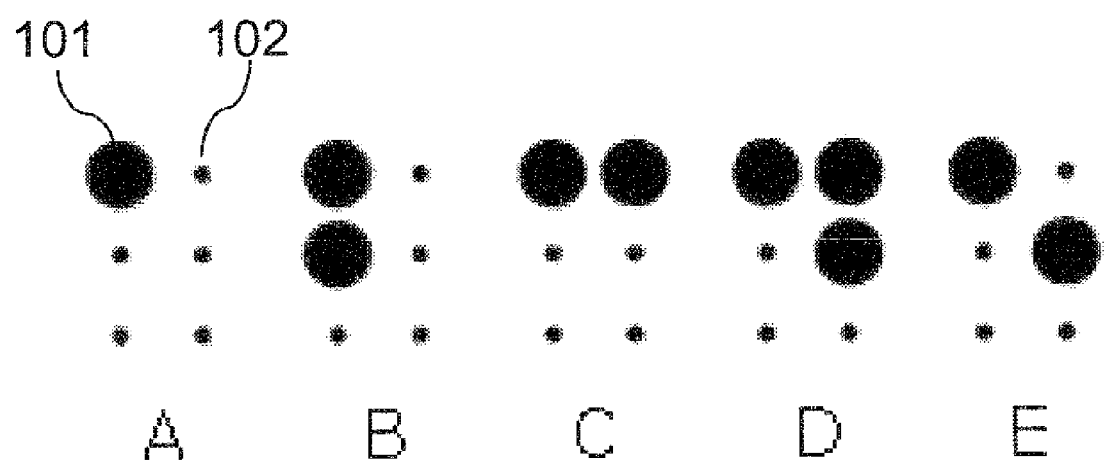
FIG. 1 is a diagram presenting examples of six-dot Braille characters.

This scan method emulates the traditional Braille representation by placing the dots in a virtual 2×3 matrix similar to the matrix used in ordinary Braille displays and as shown in FIG. 1. While there is only one actuator 220 which moves the entire display 210, the movement of the display 210 is linked to the movement of a user's finger on the screen. Users moving their finger on the screen thus receive the impression of moving their finger from dot to dot and thereby to scan dots one at a time. Because Braille characters are placed according to the touch location of the finger, all six dots must be read with a single gesture in the presented embodiment. Dots are available for reading from the moment when a user touches the screen until the finger is lifted off. When the user touches the screen for the second time, the dot positions are calculated and adjusted again for the next character. In addition, all dots are read in numerical order starting from dot 1.

FIG. 7 schematically presents the screen 700 of display 210.

In Braille scan, users start the reading by placing their finger at a random position on the upper part 701 of the screen 700. When assuming the screen 700 to comprise by way of example 800×480 pixels and a total height of 55 millimeters (mm), this upper part 701 could be defined as a rectangle containing the uppermost 32 mm (280 pixels) of the whole 55 mm (480 pixels) area in terms of vertical direction. Since in the Braille scan option the Braille characters are positioned downwards from the touch location, a minimum of 22.9 mm (200 pixels) might be desired to be available for users to move their finger in vertical direction.

FIG. 8 schematically presents the movement of a finger that is required in order to cause an output of all six groups of pulses and thus all six virtual dots of a Braille character.

The location 801 of the finger when first touching the screen 700 is automatically recognized and the first dot 1 of virtual Braille character is placed on this position 801 of column a) of FIG. 8. Once the finger touches the screen 700, tactile feedback for a raised or lowered dot is produced. To access the other two dots in this column, the finger is moved down by 11.5 mm (100 pixels) to position 802 for the second dot 2 and by another 11.5 mm to position 803 for the third dot 3. Feedback is produced for each next dot once the required position has been reached.

After reading the first three dots, the finger is moved upwards until it reaches the vertical height of the first dot 1. In addition, finger is moved by minimum of 1 pixel to the right to symbolize the change of column. This is represented by the diagonal arrow in column b) of FIG. 8.

The touch information evaluation module 224 recognizes when the location of a user's finger matches these two conditions and corresponds to position 804 in column c) of FIG.

8. Thereupon the actuator driver module 223 produces tactile feedback for the fourth dot 4. To access the fifth and the sixth dot 5 and 6, the finger is moved downwards via position 805 to position 806 by a total of 23 (11.5+11.5) mm.

The predetermined distance in action 604 of FIG. 6 would thus be zero in this option and the action could be omitted. The respective predetermined distance in a predetermined direction that is checked in action 608 between the feedback for dots 1 and 2, dots 2 and 3, dots 4 and 5, and dots 5 and 6 is 11.5 mm downwards. The predetermined distance in a predetermined direction that is checked in action 608 between the feedback for dots 3 and 4 has an upward component of 23 mm and a component to the right of at least 1 pixel.

Feedback is produced only once for each dot. Thus, it is not possible to go backwards and feel dots again, unless further measures are provided. Such measures could include for instance detecting two short taps on the display 210 as an indication to recommence with a presentation of the last character or detecting three short taps on the display 210 as an indication to recommence with a presentation of the entire text, etc. Further measures could be provided for example for the case that a gesture for reading a character is interrupted before the entire character has been presented.

The dimension of dots and characters are standardized in physical Braille characters. Normally the dots are placed in a grid defined by a 2.5 mm distance between individual dots. Since it would be difficult to make the finger movements precise enough to separate virtual dots using the standard dimensions, the standard distance was multiplied for the presented exemplary embodiment by 4.6 to make the gaps between dots with 11.5 mm distinguishable enough. Obviously, any other distance could be selected as well. One of the strengths of virtual Braille representations is that these dimensions could even be adapted individually to users. A value that is found to be comfortable by a user could then be stored for example in the data and settings storage portion 322 of memory 320, where it can be accessed by processor 310 whenever required.

A variation of the first option illustrated in FIG. 8 will be presented in the following as a second option or as 'Optimized Braille scan'.

Figure 9:
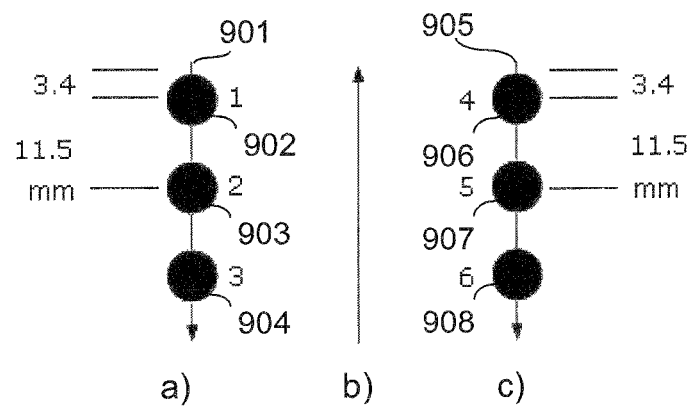
FIG. 9 is a diagram illustrating a second exemplary implementation of a vertical scan.

The second option is illustrated in FIG. 9, which schematically presents a movement of a finger that may be required to cause an output of all six groups of pulses of a Braille character in this option.

After the touch position 901 of the finger in the upper part 701 of the screen 700 is automatically recognized by touch information evaluation module 224, a user has to move the finger at first downwards by 3.4 mm (30 pixels) to position 902, before the user obtains feedback for the first dot 1, as shown in column a) of FIG. 9. Thus, in this option the feedback for the first dot 1 is produced based on the movement of the finger on the screen 700, whereas in the first option the feedback is launched at the very moment of the touch event.

After the feedback for the first dot 1, the finger is moved down by 11.5 mm (100 pixels) to position 903 for the second dot 2 and by another 11.5 mm to position 904 for the third dot 3.

After reading the third dot 3, the finger is moved upwards by minimum of 11.5 mm (100 pixels) from the location 904 of the third dot 3. This is represented in column b) of FIG. 9 by an arrow pointing upwards. When this height has been reached, the finger can be moved downwards again to read the last three dots 4-6. The touch information evaluation module 224 recognizes when the user's finger stops moving upwards and starts to move down again and uses this information for placing of the fourth dot 4. The fourth dot is placed when the finger is determined to have reached position 906, 3.4 mm (30 pixels) below the location 905 where the direction of the finger movement changed, as shown in column c) of FIG. 9. This way, the feedback of the fourth dot 4 is not produced unexpectedly and users can better control the reading themselves. To access the fifth and the sixth dot, the finger is moved downwards via position 907 to position 908 by a total of 23 (11.5+11.5) mm.

Thus, the predetermined distance in a predetermined direction that is checked in action 604 of FIG. 6 is 3.4 mm downwards in this case. The respective predetermined distance in a predetermined direction that is checked in action 608 between the feedback for dots 1 and 2, dots 2 and 3, dots 4 and 5, and dots 5 and 6 is 11.5 mm downwards. The predetermined distance in a predetermined direction that is checked in action 608 between the feedback for dots 3 and 4 requires in contrast a composite movement, namely first a movement upwards by at least 11.5 mm followed by a movement downward by 3.4 mm.

In contrast to the first option, the second option enables the user to mentally prepare for the start of the feedback for the first and the fourth dot and reduces thereby the risk that the user misses these dots completely. In contrast to the first option, moreover no horizontal movement is needed to access the second column of dots. A tracking of horizontal movements is not required at all since these are unavoidable anyway. This is the case especially when users can not use their sight. Furthermore, users do not necessarily need to move their finger all the way up to the height of the first dot in the second option. Both features reduce possible problems in reaching the correct position for the presentation of the fourth dot that might occur in the first option presented with reference to FIG. 8.

In experiments presenting users with 29 random letters one at a time, optimized Braille scan performed at 97% recognition rate after three sessions. The average reading speed of a character was 5.7 seconds.

Figure 10:
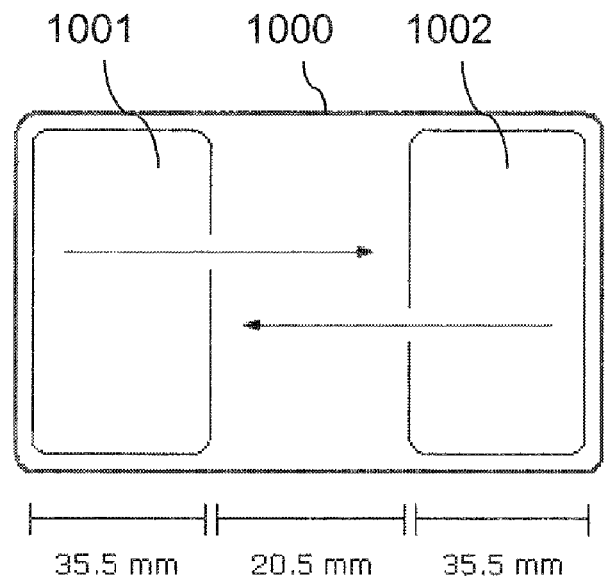
FIG. 10 is a diagram illustrating a start area for a horizontal sweep of a display that may be supported by the operation of FIG. 6.
Figure 11:
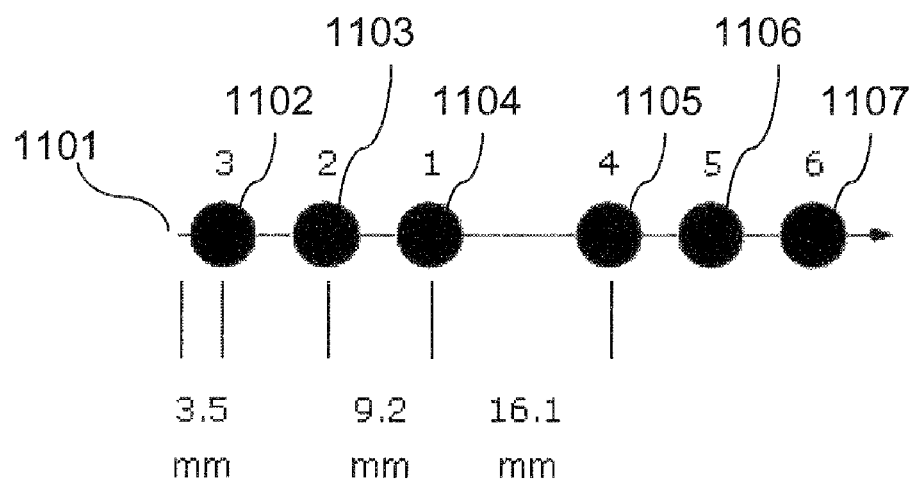
FIG. 11 is a diagram illustrating an exemplary implementation of a horizontal sweep.

A third option illustrated in FIGS. 10 and 11 is referred to as 'Braille sweep'.

The Braille sweep is based on a virtual horizontal alignment of the Braille dots. Mechanical Braille writers and modern portable note takers use a six-key entry for forming Braille characters. The left hand controls dots 3, 2, and 1 (using ring finger, middle finger, and index finger, respectively) and the right hand dots 4, 5, and 6 (using index finger, middle finger, and ring finger, respectively). This horizontal representation is adopted to be used in a virtual environment. Conventionally, this representation is meant for inputting data, not for reading purposes. Compared to the scan method, the potential of a sweeping approach lies in easier gestures as users can read all the dots by simply moving their finger from left to right or from right to left.

FIG. 10 schematically presents again the screen 1000 of display 210.

Users can control the reading direction of Braille sweep by starting the gesture either from the left or the right side of the screen 1000. To read all six dots using a sweep gesture, 56 mm (490 pixels) of free screen space might be desired to be available in horizontal direction. Because of this, sweep gestures are started either inside a first rectangular area 1001 on the left hand side of the screen 1000 or inside a second rectangular area 1002 on the right hand side of the screen 1000. Both areas 1001, 1002 have a width of 35.5 mm (310 pixels). If the finger lands in area 1001 on the left side of the screen 1000, dots are placed to the right from the touch location. In the same manner, a touch in area 1002 on the right side of the screen 1000 results in dots being placed to the left from the touch location.

In the presented embodiment of the third option, the dots are grouped for presentation based on the traditional way of Braille writers, i.e. there is more free space between dots 1 and 4. Also in this embodiment the dots are dynamically lined up so that the first dot is right next to the location where the finger first touches the screen.

An example of the Braille sweep gesture is illustrated in FIG. 11 where a character is read from left to right. Proceeding from the touch location 1101 in area 1001, the tactile feedback for the first dot from the left (dot 3), is provided when the finger reaches a location 1102 at 3.5 mm (30 pixels) right from the touch location 1101. From the location of this first dot 3 the finger is moved to the right by 9.2 mm (80 pixels) to reach location 1103, where the second dot (dot 2) is presented. In the same way, the third dot (dot 1) is read by moving the finger to the right by another 9.2 mm to location 1104. After the third dot, the finger is moved further right by 16.1 mm (140 pixels) to reach the location 1105 for reading the fourth dot (dot 4). This longer gap between the third and the fourth dot divides the dots into two groups. From the fourth dot the finger is moved to the right by 9.2 mm (80 pixels) to reach the location 1106 for the fifth dot (dot 5) and by another 9.2 mm to reach the location 1107 for the sixth dot (dot 6).

The vertical position of a user's finger does not have an effect on the reading and thus it could be allowed that a user makes a sweep gesture either on the upper or on the lower part of the screen area. It is also possible for example to start a sweep gesture from the top left corner of the screen 1000 and continue towards the bottom right corner of the screen 1000.

Figure 12:
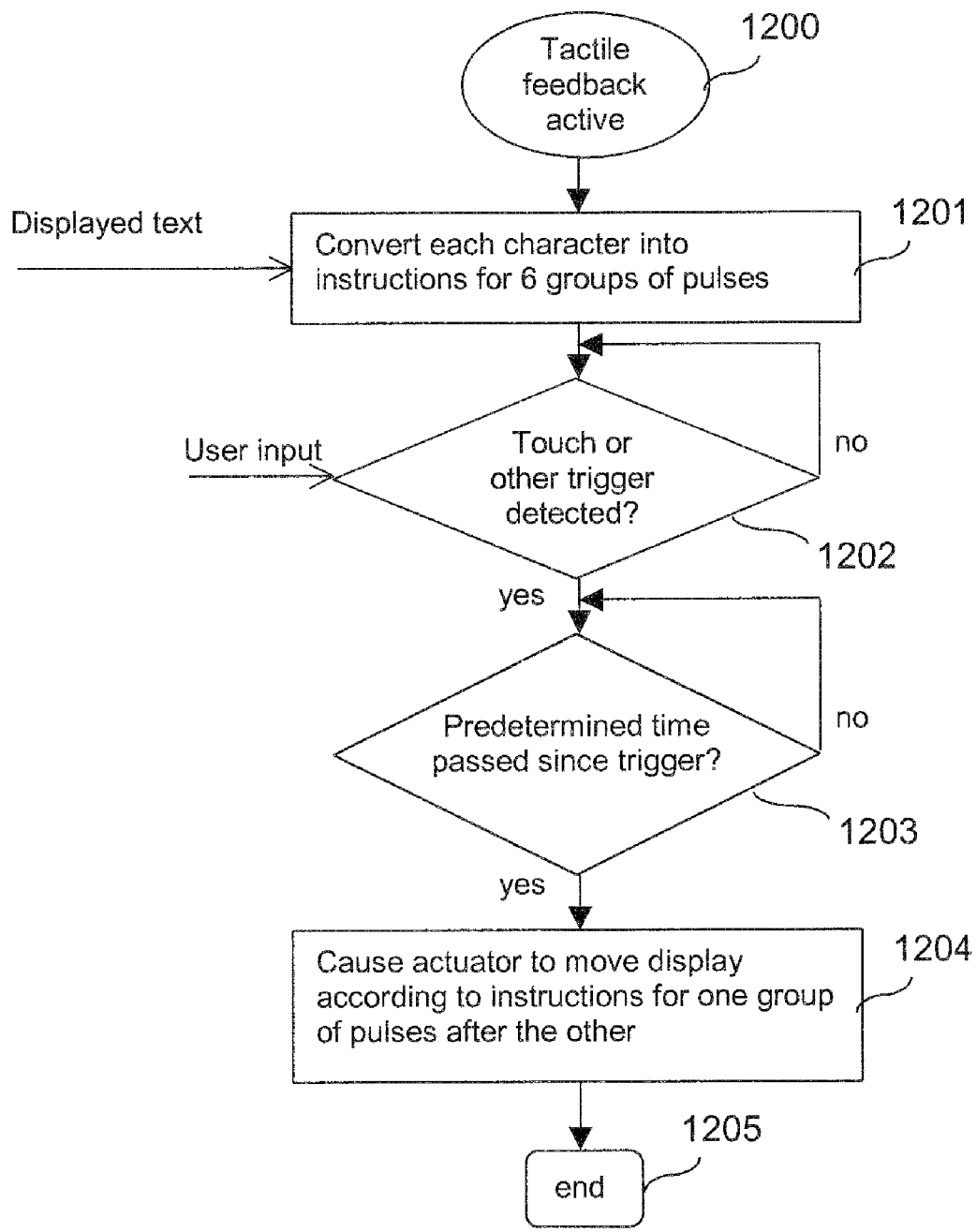
FIG. 12 is a flow chart illustrating a second exemplary operation of the device of FIG. 2.

In experiments presenting users with 29 random letters one at a time, Braille sweep performed at 92% recognition rate after three sessions. The average reading speed of a character was 5.0 seconds A second exemplary operation of device 200 that may be realized for the presentation of text will now be described in more detail with reference to the flow chart of FIG. 12. For this operation, the display 210 can but does not have to have touchscreen.

Also the second embodiment of an operation may be realized by the functional modules of device 200 of FIG. 2, and thus equally by processor 310 when executing the corresponding computer program code 321 retrieved from memory 320.

In device 200, module 230 provides textual information for presentation. Display control module 211 takes care that the information is visually presented on display 210.

When device 200 is set to a tactile feedback mode (action 1200), the information is provided alternatively or in addition to the information conversion module 222.

Information conversion module 222 converts each textual character into instructions for six groups of pulses as in action 601 and provides the instructions to the actuator driver 223 (action 1201).

In case the display 210 comprises a touchscreen, the actuator driver 223 may wait for an indication by touch information evaluation module 224 that a touch has been detected by input detection module 212 before the tactile feedback is provided. Otherwise, the actuator driver 223 may wait for another kind of user input for triggering the tactile feedback. (action 1202)

The actuator driver 223 may further wait for a predetermined time before providing a tactile feedback after a trigger like a touch has been detected. (action 1203)

Then, the actuator driver 223 causes the actuator 220 to move the display 210 according to the received instructions automatically for one group of pulses after the other. (action 1204)

Once the instructions for all groups of pulses have been carried out, the operation is completed. (action 1205)

This approach is referred to as 'Braille rhythm'. It enables users to read Braille characters as tactile icons by holding their finger still on the screen. Braille rhythm characters are composed of sequentially produced tactile feedback where Braille dots are in numerical order. To read Braille using a rhythm method users touch any screen location to start the feedback and hold their finger still until feedback for all the six dots of all Braille characters has been produced. In case the display 210 does not comprise a touchscreen, the tactile feedback is started some other way, for instance by pressing a predetermined button.

Figure 13:
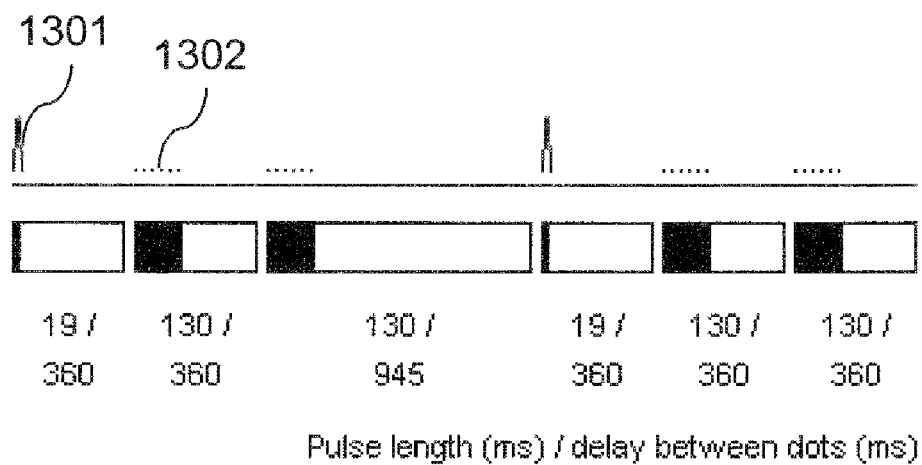
FIG. 13 is a diagram illustrating a first exemplary rhythm representing a Braille character that may be supported by the operation of FIG. 12.
Figure 14:
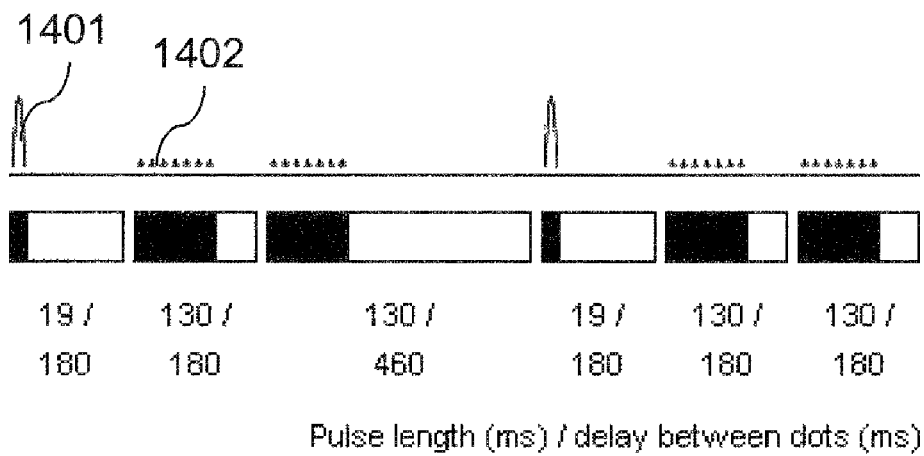
FIG. 14 is a diagram illustrating a second exemplary rhythm representing a Braille character that may be supported by the operation of FIG. 12.

There are various possibilities for the rhythm that can be used. One option would be to use the representation of raised and lowered pulses as presented in FIG. 4. FIGS. 13 and 14 present two alternatives, in which each dot is represented by a single pulse, and in which the raised and lowered pulses are only distinguished by the pulse length.

FIG. 13 shows on top a representation of six dots of a Braille character for the letter 'c' in a row, the first and fourth dots being raised 1301, while the other dots are lowered 1302. Below the dots, pulse lengths in mm are indicated in black and delays in mm between the pulses are indicated in white.

To avoid the problem with the first dot being felt too soon when a user's finger touches the screen, there is a start delay before the beginning of the tactile feedback for the first dot. This start delay may be the same as a delay set between dots (i.e. the speed of the rhythm).

The delay between individual dots is set to 360 ms. When the screen has been touched and the start delay has passed, the feedback for the first dot is started. In this case the first dot is raised, so a 19 ms feedback representing a raised dot is produced. After this the actuator driver module 223 waits for 341 ms before the given 360 ms delay between dots has been reached. The second dot is lowered and therefore a 130 ms feedback is produced next. After this the application waits for 230 ms before the given 360 ms delay between dots has been reached. This same concept is applied to the remaining dots with the exception that the application waits 2.6 times longer between the third and the fourth dot. The purpose of this is to make it easier to distinguish the two dot columns and thus to provide cues to help users to recognize characters. The duration of one character is determined by the delay between onset times of feedback pulses for individual dots. In this example the total duration from the onset of the first pulse to the offset of the last pulse is 2515 milliseconds.

It has to be noted that it would be possible to provide in addition a different amplitude for the feedback for raised and lowered dots instead of different pulse durations only.

In experiments presenting users with 29 random letters one at a time, Braille rhythm using the 360 ms speed performed at 92% recognition rate after three sessions. As the speed of the rhythm was fixed, the reading speed of a character was 2.45 seconds.

The speed of Braille rhythm is easy to adjust by changing the delays and the speed of haptic playback. A preferred speed could be stored for example in the data and settings storage portion 322.

FIG. 14 is a diagram illustrating a variation of the option of FIG. 13, which uses a different rhythm.

In this implementation, the delay between individual dots is set to 180 ms, and the total duration of a character is 1310 milliseconds. This duration varies a bit depending on the sixth dot as the feedback on raised dots 1401 is shorter than on lowered dots 1402. If the last dot was raised, the total length of this character would be 1199 ms.

In experiments presenting users with 29 random letters one at a time, Braille rhythm using the 180 ms speed performed at 70% recognition rate. As the speed of the rhythm was fixed, the reading speed of a character was approximately 1.25 seconds.

Compared to the other presented options, Braille rhythm is based on a different metaphor. Instead of an existing, spatial Braille representation such as the standard 2×3 matrix in scan or the horizontal alignment from Braille writers in sweep, all the dots are felt on the same location. When using such temporal coding, users cannot control the speed of the feedback by moving their finger from dot to dot. The feedback for dots is produced using a fixed speed. On the other hand, Braille rhythm opens new possibilities for using a significantly faster representation and thus faster reading speeds as there is no need to move the finger from dot to dot on the screen. In addition Braille rhythm can be used with devices that do not have a touchscreen—potentially with any device having sufficiently good tactile actuators.

Figure 15:
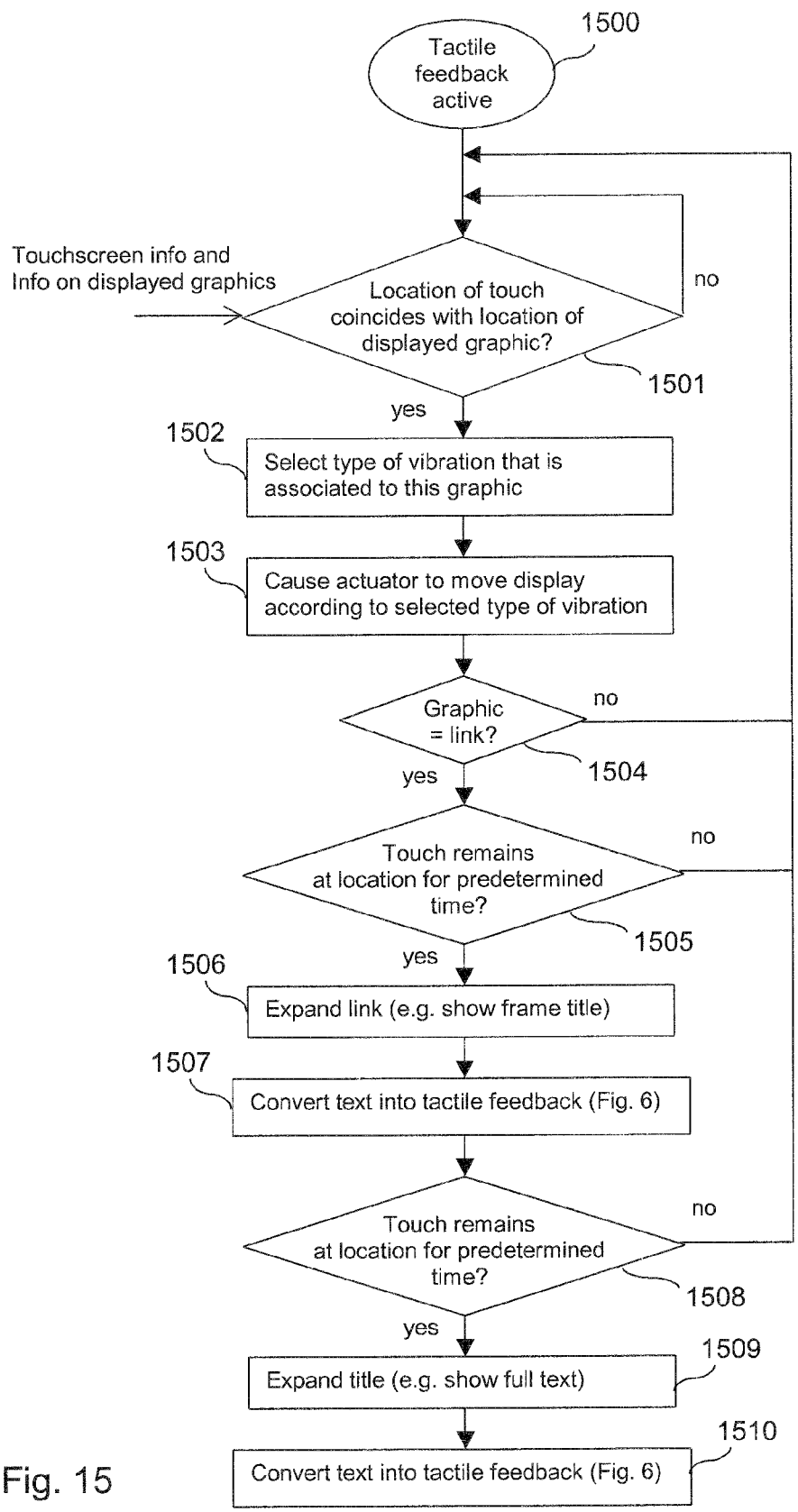
FIG. 15 is a flow chart illustrating a further exemplary operation of the device of FIG. 2 enabling a representation of graphical elements.

Finally, a third exemplary operation of the device 200 will now be described in more detail with reference to the flow chart of FIG. 15.

This operation enables in addition feedback for graphical information. The operation of FIG. 6 is integrated as a partial operation in the operation of FIG. 15.

The presented operation can be realized again by the functional modules of device 200 of FIG. 2, and equally by processor 310 when executing the corresponding computer program code 321 retrieved from memory 320.

In device 200, module 230 provides information including graphical elements for presentation. Display control module 211 takes care that the information is visually presented on display 210.

When device 200 is set to a tactile feedback mode (action 1500), the information is provided alternatively or in addition to the information conversion module 222.

The information conversion module 222 recognizes that the received information comprises information on at least one graphic and provides the location of the graphic in a visual presentation to the touch information evaluation module 224. The touch information evaluation module 224 receives in addition information about a user input via the touchscreen of display 210 from the input detection module 212.

The touch information evaluation module 224 determines whether the location of a detected touch coincides with the location of a displayed graphic (action 1501).

If this is the case, it provides a corresponding indication to the information conversion module 222, which selects instructions for a type of vibration that is associated to the type of graphic that is presented at the touched location (action 1502). For example, in case the touched location corresponds to the location of presentation of a frame, instructions for a vibration with a sequence of pulses 502 represented in FIG. 5 could be selected, while in case the touched location corresponds to the location of presentation of a link, instructions for a vibration with a sequence of pulses 501 represented in FIG. 5 could be selected.

The information conversion module 222 then instructs the actuator driver module 223 to cause the actuator 220 to move the display 210 according to the appropriate type of vibration (action 1503).

It is to be understood that in case it has been ensured that the information provided by module 230 represents only a single graphic, the evaluation of the location of a touch of the display 210 in action 1501 could be omitted. In this case, the information conversion module 222 could select immediately instructions for a type of vibration that is associated to the type of graphic for which information is received (action 1502) and provide the instructions to the actuator driver 223. The touch information evaluation module 224 could simply detect any touch of the display 210 and inform the actuator driver 223, whereupon the actuator driver 223 could cause the actuator to move according to the received instructions (action 1503).

In case the graphic element is a link to the suppressed content of a web page frame (action 1504), the information presentation module 230 further determines whether the touch remains at the location for a predetermined prolonged time, for example for 0.5 to 1 second (action 1505). If this is the case, the link is expanded by information presentation module 230 to show the full title of a frame (action 1506).

The information presentation module 230 may be informed about the prolonged touch directly by the input detection module 211 and evaluate itself whether the location of the prolonged touch on the screen corresponds to the location of a link. Alternatively, it could be informed by the touch information evaluation module 224 (connection not shown in FIG. 2).

The information presentation module 230 then provides the full title of the frame to the information conversion module 222, and the text is converted into a tactile feedback as described with reference to FIG. 6 (action 1507).

The information presentation module 230 further determines whether the touch remains on the title of the frame for a predetermined prolonged time after the Braille title text has been read, for example for 0.5 to 1 second (action 1508).

If this is the case, information presentation module 230 expands the title to show the full text of the frame (action 1509).

The information presentation module 230 then provides the full text of the frame to the information conversion module 222, and the text is converted into a tactile feedback as described with reference to FIG. 6 (action 1510).

It is to be understood that the distribution of the tasks and the route of information could be implemented in many different ways just the same.

Certain embodiments of the invention thus enable the use of a tactile feedback in a cost efficient manner and handy manner.

When using a single actuator for the feedback, the costs and the power consumption can be significantly lower than with a device comprising a plurality of mechanical actuators. Nevertheless, the tactile feedback can be presented with large variety due to the variability of a pulsed output. Compared to conventional Braille displays, a feedback for graphical elements can even be provided in addition.

Further, when using only a single actuator, this actuator can be integrated in the information providing device itself. Thus, certain embodiments of the invention allow preventing the need of a separate device for the tactile feedback without requiring integration of a plurality of electromechanical parts in the information providing device. As a result, it may moreover not be required to produce separate information providing devices for the visually impaired at high costs. Instead, a regular device having an actuator available could be enhanced simply by downloading Braille reading software.

While the employed tactile feedback is different from conventional Braille feedback, experiments showed that it can be used without extensive practicing. Getting used to this new approach may be in particular of advantage for cases in which the amount of information to be acquired is not extremely vast.

Certain embodiments of the invention are thus particularly suitable for mobile usage contexts where Braille displays are impractical or not available at all. This allows the visually impaired to privately access information on their mobile devices without circumstance. By enabling a tactile feedback using a single mobile device of reasonable size, the tactile feedback can be used conveniently at any location, not only at home or at office but also when carried along. In general, embodiments of the invention are suited to facilitate the use of various devices in everyday life of the visually impaired. In addition, representation of graphical content by tactile feedback can be beneficial to the non blind user segments as well.

It is to be understood that any presented connection is to be understood in a way that the involved components are operationally coupled. Thus, the connections can be direct or indirect with any number or combination of intervening elements, and there may be merely a functional relationship between the components.

Further, any of the mentioned processors could be of any suitable type, for example a computer processor, an application-specific integrated circuit (ASIC), etc. Any of the mentioned memories could be implemented as a single memory or as a combination of a plurality of distinct memories, and may comprise for example a read-only memory, a flash memory or a hard disc drive memory etc. Furthermore, any other hardware components that have been programmed in such a way to carry out the described functions could be employed as well.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as field-programmable gate arrays, application-specific integrated circuits (ASICs), signal processing devices, and other devices.

The functions illustrated by module 222 can be viewed as means for converting at least one of textual information and graphical information into instructions for a sequence of pulses representing the information. The functions illustrated by module 223 can be viewed as means for causing an actuator to move a display according to the obtained instructions.

The functions illustrated by the combination of processor 310 and memory 320 can equally be viewed as such means. The program code 321 can also be viewed as comprising such means in the form of functional modules.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
converting at least one of a textual information and graphical information into instructions for a sequence of pulses representing the information,
wherein the instructions for the sequence of pulses comprise instructions for a sequence of groups of subsequent pulses;
causing a single actuator, which is configured to convert energy into a movement, to move a display in the sequence of pulses according to the instructions; and
detecting a moving of a touch on a display by a predetermined distance in a predetermined direction before causing the actuator to move the display according to instructions for a respective next group of pulses,
wherein each group of pulses represents one dot of a six-dot Braille character, wherein the predetermined direction comprises a vertical downward direction between causing the actuator to move the display according to the instructions for the groups of pulses for the first and the second dot, a vertical downward direction between causing the actuator to move the display according to the instructions for the groups of pulses for the second and the third dot, a vertical upward direction between causing the actuator to move the display according to the instructions for the groups of pulses for the third and fourth dot, a vertical downward direction between causing the actuator to move the display according to the instructions for the groups of pulses for the fourth and the fifth dot, and a vertical downward direction between causing the actuator to move the display according to the instructions for the groups of pulses for the fifth and the sixth dot.

2. The method according to claim 1, wherein the actuator is a piezoelectric actuator.

3. The method according to claim 1, wherein the information is information that is visually presented on the display.

4. The method according to claim 1, wherein the information is textual information and wherein the sequence of pulses comprises for each character of the textual information a plurality of subsequent groups of subsequent pulses, each group of pulses representing one dot of a multi-dot Braille character.

5. The method according to claim 1, wherein the display comprises a touchscreen.

6. The method according to claim 5, comprising causing the actuator to move the display according to the instructions upon detection of a touch of the touchscreen by a user.

7. The method according to claim 5, further comprising detecting a moving of a touch on the touchscreen by a predetermined distance in a predetermined direction before causing the actuator to move the display.

8. The method according to claim 1, wherein the predetermined direction between causing the actuator to move the display according to the instructions for the groups of pulses for the third and the fourth dot comprises in addition to the vertical upward direction a subsequent vertical downward direction.

9. The method according to claim 1, wherein the predetermined direction comprises a horizontal direction.

10. The method according to claim 5, comprising causing the actuator to move the display according to the instructions after a predetermined period of time after detection of a touch of the touchscreen by a user.

11. The method according to claim 1, comprising causing the actuator to move the display according to the entire instructions at a predetermined speed.

12. The method according to claim 1, wherein different pieces of information are represented by pulses with at least one of
different amplitudes;
different frequencies;
different shapes; and
different rhythms.

13. An apparatus comprising
a processor, and
a memory including computer program instructions, the memory and computer program instructions being configured to, in cooperation with the processor, cause the apparatus to:
convert at least one of textual information and graphical information into instructions for a sequence of pulses representing the information, wherein the instructions for the sequence of pulses comprise instructions for a sequence of groups of subsequent pulses;
cause a single actuator, which is configured to convert energy into a movement, to move a display in the sequence of pulses according to the instructions; and
detect a moving of a touch on the display by a predetermined distance in a predetermined direction before causing the actuator to move the display to instructions for a respective next group of pulses,
wherein each group of pulses represents one dot of a six-dot Braille character, wherein the predetermined direction comprises a vertical downward direction between causing the actuator to move the display according to the instructions for the groups of pulses for the first and the second dot, a vertical downward direction between causing the actuator to move the display according to the instructions for the groups of pulses for the second and the third dot, a vertical upward direction between causing the actuator to move the display according to the instructions for the groups of pulses for the third and the fourth dot, a vertical downward direction between causing the actuator to move the display according to the instructions for the groups of pulses for the fourth and the fifth dot, and a vertical downward direction between causing the actuator to move the display according to the instructions for the groups of pulses for the fifth and sixth dot.

14. The apparatus according to claim 13, wherein the actuator is a piezoelectric actuator.

15. The apparatus according to claim 13, wherein the information is information that is visually presented on the display.

16. The apparatus according to claim 13, wherein the information is textual information and wherein the sequence of pulses comprises for each character of the textual information a plurality of subsequent groups of subsequent pulses, each group of pulses representing one dot of a multi-dot Braille character.

17. The apparatus according to claim 13, wherein the display comprises a touchscreen, the processor being configured to detect a touch of the touchscreen by a user and to cause the actuator to move the display according to the instructions upon detection of a touch of the touchscreen by a user.

18. The apparatus according to claim 17, the processor further configured to detect a moving of a touch on the touchscreen by a predetermined distance in a predetermined direction before causing the actuator to move the display.

19. The apparatus according to claim 13, wherein the predetermined direction between causing the actuator to move the display according to the instructions for the groups of pulses for the third and the fourth dot comprises in addition to the vertical upward direction a subsequent vertical downward direction.

20. The apparatus according to claim 13, wherein the predetermined direction comprises a horizontal direction.

21. The apparatus according to claim 17, the processor being configured to cause the actuator to move the display according to the instructions after a predetermined period of time after detection of a touch of the touchscreen by a user.

22. The apparatus according to claim 13, the processor being configured to cause the actuator to move the display according to the entire instructions at a predetermined speed.

23. The apparatus according to claim 13, wherein different pieces of information are represented by pulses with at least one of
different amplitudes;
different frequencies;
different shapes; and
different rhythms.

24. A device comprising:
the apparatus according to claim 13;
the display; and
the actuator, the actuator being configured to enable a movement of the display.

25. The device according to claim 24, wherein the display comprises a touchscreen.

26. A non-transitory computer readable storage medium in which computer program code realizing the following when executed by a processor is stored:
converting at least one of textual information and graphical information into instructions for a sequence of pulses representing the information, wherein the instructions for the sequence of pulses comprise instructions for a sequence of groups of subsequent pules;
causing a single actuator, which is configured to convert energy into a movement, to move a display in the sequence of pulses according to the instructions; and
detecting a moving of a touch on a display by a predetermined distance in a predetermined direction before causing the actuator to move the display according to instructions for a respective next group of pulses,
wherein each group of pulses represents one dot of a six-dot Braille character, wherein the predetermined direction comprises a vertical downward direction between causing the actuator to move the display according to the instructions for the groups of pulses for the first and the second dot, a vertical downward direction between causing the actuator to move the display according to the instructions for the groups of pulses for the second the third dot, a vertical upward direction between causing the actuator to move the display according to the instructions for the groups of pulses for the third and the fourth dot, a vertical downward direction between causing the actuator to move the display according to the instructions for the groups of pulses for the fourth and the fifth dot, and a vertical downward direction between causing the actuator to move the display according to the instructions for the groups of pulses for the fifth and the sixth dot.

27. An apparatus comprising:

means for converting at least one of textual information and graphical information into instructions for a sequence of pulses representing the information, wherein the instructions for the sequence of pulses comprise instructions for a sequence of groups of subsequent pulses; and means for causing a single actuator, which is configured to convert energy into a movement, to move a display in the sequence of pulses according to the instructions; and means for detecting a moving of a touch on a display by a predetermined distance in a predetermined direction before causing the actuator to move the display according to instructions for a respective next group of pulses, wherein each group of pulses represents one dot of a six-dot Braille character, wherein the predetermined direction comprises a vertical downward direction between causing the actuator to move the display according to the instructions for the groups of pulses for the first and the second dot a vertical downward direction between causing the actuator to move the display according to the instructions for the groups of pulses for the second and the third dot, a vertical upward direction between causing the actuator to move the display according to the instructions for the groups of pulses for the third and the fourth dot, a vertical downward direction between causing the actuator to move the display according to the instructions for the groups of pulses for the fourth and the fifth dot, and a vertical downward direction between causing the actuator to move the display according to the instructions for the groups of pulses for the fifth and the sixth dot.

28. The method according to claim 1, wherein at least one of textual information that is converted into the instructions for a single sequence of pulses representing the information comprises at least one character; and graphical information that is converted into the instructions for a single sequence of pulses representing the information comprises a two-dimensional representation.

29. The apparatus according to claim 13, wherein at least one of textual information that is converted into the instructions for a single sequence of pulses representing the information comprises at least one character; and graphical information that is converted into the instructions for a single sequence of pulses representing the information comprises a two-dimensional representation.

\* \* \* \* \*

UNITED STATES PATENT AND TRADEMARK OFFICE
CERTIFICATE OF CORRECTION

PATENT NO. : 8,388,346 B2  
APPLICATION NO. : 12/202262  
DATED : March 5, 2013  
INVENTOR(S) : Rantala et al.

Page 1 of 1

It is certified that error appears in the above-identified patent and that said Letters Patent is hereby corrected as shown below:

In the Claims:

Column 18,  
Line 10, "converting at least one of a textual information" should read --converting at least one of textual information--;  
Lines 33 and 34, "the third and fourth dot" should read --the third and the fourth dot--.

Column 19,  
Line 32, "move the display to" should read --move the display according to--;  
Line 52, "and sixth dot" should read --and the sixth dot--.

Column 20,  
Line 42, "subsequent pules" should read --subsequent pulses--;  
Line 57, "second the" should read --second and the--.

Column 21,  
Line 19, "second dot" should read --second dot,--.

Signed and Sealed this  
Seventeenth Day of September, 2013

Teresa Stanek Rea  
*Deputy Director of the United States Patent and Trademark Office*